UNITED STATES PATENT OFFICE.

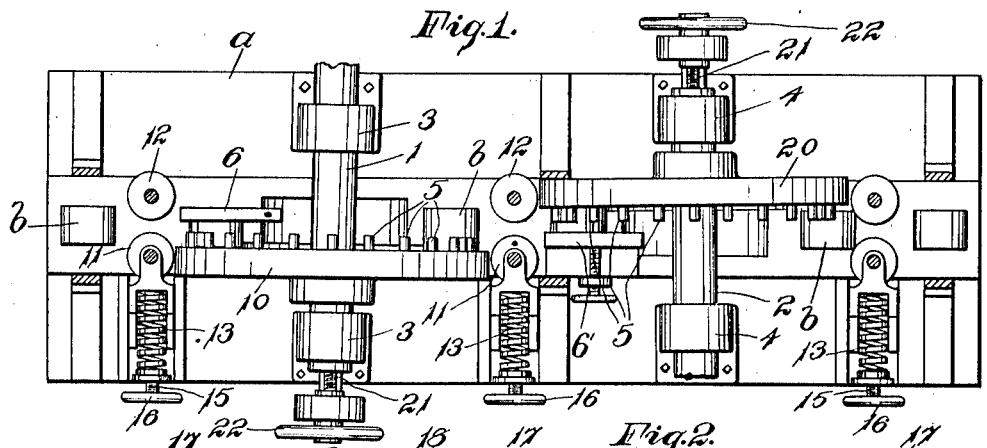

CORNELIUS S. VOSBURGH AND JOSEPH L. G. BLOUIN, OF WATERBURY, CONNECTICUT.

ROTARY BAR-SCALPER.

1,072,061.                    Specification of Letters Patent.    Patented Sept. 2, 1913.

Application filed October 11, 1910. Serial No. 586,474.

*To all whom it may concern:*

Be it known that we, CORNELIUS S. VOSBURGH and JOSEPH L. G. BLOUIN, both citizens of the United States, and residents of Waterbury, in the county of New Haven and State of Connecticut, have invented certain new and useful Improvements in Rotary Bar-Scalpers, of which the following is a specification.

The object of the invention is to produce a machine of the character described having novelty and advantage, and more especially to improve the process of scalping and reduce the expense of the process.

Referring to the drawings: Figure 1 is a plan view of the machine with the top of the frame and the feed roll driving mechanism removed. Fig. 2 is a side elevation of the same. Fig. 3 is a sectional view on the line 3, 3, of Fig. 2.

This machine is designed for the purpose of clearing from the sides of metal bars the scale which is left on the bar after the preliminary rolling operation has been completed.

$a$ denotes the bed of the machine having the transversely arranged rolls $b$ forming a track on which the stock which is to be operated upon passes through the machine.

10, 20, denote opposed rotary cutter head disks, one being arranged in advance of the other, and mounted on shaft 1, 2, supported in suitable bearings 3, 3 and 4, 4. Projecting from the front face of each disk and arranged in a circular row near its edge are a series of operating tools 5.

The bars which are to be operated upon, and one of which is indicated at $r$, are introduced edgewise, and one side of the bar is first operated upon by the tools of the disk 10, and then the other side is operated upon by the tools of the disk 20. These tools operate only during their downward travel, and the shafts 1—2 are inclined slightly in a horizontal plane so that as the tools are traveling up they will clear the bar. Supports 6, 6' one of which is adjustable are provided opposite the point where the cutting takes place to prevent the bar from springing away from the tool.

Vertically arranged feed rolls 11, 12, are provided, one of which 12 is mounted in fixed bearings, the other roll 11 being adjustable toward or away from the fixed roll in order to accommodate bars of varying thickness. This adjustable roll 11 is held up in position by the compression spring 13 and the force which it exerts can be varied by means of the threaded stem 15 having a hand-wheel 16. Its driving shaft is preferably sectional and has a universal joint so as to permit of any slight lateral movement of the roll which may be necessary. At their upper ends the shafts are supported in a frame $f$ and carry worm-wheels 17 which are engaged by a worm-pinion 18. As many pair of feed rolls are to be used as may be desirable or necessary. As these bars vary slightly in thickness the shafts 1, 2, which carry the disks 10, 20, are provided with means for moving them lengthwise through their bearings, in order to correctly position the operating tools so that they will take a proper cut. The method of securing this adjustment which is illustrated comprises a threaded stem 21 and a hand wheel 22 mounted in a stationary part of the bearing and engaging the shaft.

There is thus provided a continuously operating scalping machine which acts upon both sides of the bar simultaneously but at different points. The cutting tools while they are performing their work move in a curved path transversely of the bar. The chips drop down through the bed of the machine as soon as they are formed so that they do not further interfere with the operation of the cutting tools.

We claim:—

1. In a machine of the character described, a frame, a longitudinal track therethrough on which a bar of stock travels on edge through the machine, a set of bearings arranged in alinement on opposite sides of said track, a shaft supported in said bearings, a tool-carrying disk secured to the shaft at one side of said track, metal scalping tools projecting from one of the flat faces of said disk toward the track, means for adjusting said disk to bring said tools into operative relation with one side of a piece of stock as it travels along said track, a second set of bearings located beyond the first set and arranged in alinement on opposite sides of the track, a shaft supported in said bearings, a tool-carrying disk mounted on the shaft at the opposite side of the track from the first mentioned disk, metal scalping tools projecting from one of the flat faces of said disk, means for adjusting the disk to bring said tools into operative relation with the stock as it moves on the track, means for driving said shafts, feed rolls engaging the stock to cause it to move through the machine, and abutments for the stock arranged opposite the tool-carrying disks.

2. In a machine of the character described, a frame, a track extending across said frame and along which a bar of stock is moved on edge through the machine, pairs of alined bearings, one pair in advance of another, the members of each pair being mounted on opposite sides of said track, shafts supported in the bearings and extending across said track, tool-carrying disks mounted on said shafts on opposite sides of the track, metal scalping tools projecting from one of the flat faces of said disks and adapted to act upon the sides of the bar, means for adjusting said disks toward and away from the bar, abutments for the bar opposite each head, vertically arranged feed rolls mounted on opposite sides of the bar, the feed rolls on one side of the bar being adjustable toward and away from the track.

3. In a metal-working machine, the combination with the machine frame provided with a track for the passage of a bar of stock, of rotary tool-holding disks arranged at opposite sides of the stock but out of alinement with one another, and provided with metal scalping tools adapted to operate simultaneously on both sides of the stock at non-opposite points, the flat faces of said disks being approximately parallel with the sides of the stock, a bearing back of each disk, shafts to which said disks are secured, supported at their rear ends in said bearings, the forward ends of said shafts projecting beyond the flat faces of said disks, and bearings for the forward end of each shaft at the opposite side of the stock from its disk.

4. In a metal-working machine, the combination with a machine frame provided with a track for the passage of a bar of stock, of non-alined rotary tool-holding disks arranged on opposite sides of the track and provided with metal scalping tools adapted to operate simultaneously on both sides of the stock at non-opposite points, shafts supporting said disks, and bearings for said shafts located at opposite sides of the cutting planes of the tools.

CORNELIUS S. VOSBURGH.
JOSEPH L. G. BLOUIN.

Witnesses:
KATHERINE M. GORMAN,
DENNIS H. TIERNEY.

---

Copies of this patent may be obtained for five cents each, by addressing the "Commissioner of Patents, Washington, D. C."